(12) United States Patent
Zhang

(10) Patent No.: US 9,949,313 B2
(45) Date of Patent: Apr. 17, 2018

(54) DATA CARD CONNECTION MANAGEMENT METHOD, APPARATUS AND SYSTEM, AND DATA CARD

(71) Applicant: ZTE CORPORATION, Shenzhen, Guangdong Province (CN)

(72) Inventor: Jingrui Zhang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/309,445

(22) PCT Filed: Sep. 17, 2014

(86) PCT No.: PCT/CN2014/086758
§ 371 (c)(1),
(2) Date: Nov. 8, 2016

(87) PCT Pub. No.: WO2015/169020
PCT Pub. Date: Nov. 12, 2015

(65) Prior Publication Data
US 2017/0156173 A1  Jun. 1, 2017

(30) Foreign Application Priority Data

May 8, 2014 (CN) .......................... 2014 1 0193017

(51) Int. Cl.
| | | |
|---|---|---|
| *H04B 1/38* | (2015.01) | |
| *H04W 76/04* | (2009.01) | |
| *H04M 1/00* | (2006.01) | |
| *H04W 84/04* | (2009.01) | |
| *H04W 84/12* | (2009.01) | |

(52) U.S. Cl.
CPC .......... *H04W 76/04* (2013.01); *H04W 84/042* (2013.01); *H04W 84/12* (2013.01)

(58) Field of Classification Search
CPC ........................ H04B 1/3816; H04M 2250/14
USPC ........................ 455/557, 558, 552.1, 553.1
See application file for complete search history.

(56) References Cited

U.S. PATENT DOCUMENTS

2007/0139168 A1  6/2007 Rennie et al.

FOREIGN PATENT DOCUMENTS

| CN | 101141354 A | 3/2008 |
| CN | 102437943 A | 5/2012 |

*Primary Examiner* — Lee Nguyen
(74) *Attorney, Agent, or Firm* — Ling Wu; Stephen Yang; Ling and Yang Intellectual Property

(57) ABSTRACT

A data card connection management method which is applied to an electronic device on which a plurality of connection managers having connection management matching features are installed, the data card connection management method includes the following steps: when detecting that an access data card is connected to the electronic device, acquiring a connection management matching feature of the access data card; selecting a connection manager matching the connection management matching feature of the data card from the plurality of connection managers having the connection management matching features as a first target connection manager; and starting and only starting the first target connection manager. Correspondingly, a data card connection management apparatus and system, and a data card are further provided. The problem that different types of data card connection managers cannot normally operate on the electronic device is effectively solved.

14 Claims, 4 Drawing Sheets

DATA CARD CONNECTION MANAGEMENT METHOD, APPARATUS AND SYSTEM, AND DATA CARD

TECHNICAL FIELD

The present document relates to the field of wireless communication technologies and software, in particular to a data card connection management method, apparatus and system, and a data card.

BACKGROUND OF THE RELATED ART

With the popularization of computers and the high-speed development of communication technology services, computers and communication devices have already been widely applied in all aspects of life of people, and great convenience is brought by applying wireless terminal devices on PCs. With the development of 3G and 4G services in China, like European and American developed countries, wireless terminal devices will inevitably replace current fixed-network services which are relatively slow in speed and complex in installation and maintenance in several years of the future. Wireless terminal devices will have a huge development space.

Connection managers are PC applications which are used for performing operations such as network connection and setting on data cards (wireless Modem) and mobile Wifi data cards. Under general circumstances, a single connection manager can only be used on a PC. Because of reasons such as drive conflicts and the same installation path, when a plurality of connection managers are simultaneously installed by a user, a situation that a User Interface UI cannot be started will be caused; and since the connection manager which does not correspond to the data card is started, problems such as that the data card cannot be used and so on will be caused. Especially the types of the existing data cards are relatively many, which include 3G and 4G mode, and there are an ordinary online data card and a mobile Wifi data card according to the types. The types of data card management software include types such as Web UI and Personal Computer UI PC UI and so on. When the user uses various different types of data cards, the situation of inconvenience in use will occur.

When the user simultaneously has a 3G data card and a mobile Wifi data card, since a connection manager path or a software name is the same, a situation that the connection managers of the two types of data cards cannot coexist will be caused. If the connection manager of one product of the two types of data cards is used, the other connection manager must be unloaded, therefore a situation that the connection manger of one data card covers the connection manager of the other data card occurs, which causes that previous historical data of the user miss.

Since the connection managers are not compatible, and when the user uses multiple types of data card products, inconvenience is caused to the user in use and the user experience is poor.

SUMMARY

In view of this, the present document provides a data card connection management method, apparatus and system and a data card, which can solve the management problem of different types of connection managers.

The data card connection management method provided by the present document based on the above-mentioned purpose is applied to an electronic device on which a plurality of connection managers having connection management matching features are installed, and the data card connection management method includes the following steps:

when detecting that an access data card is connected to the electronic device, acquiring a connection management matching feature of the access data card;

selecting a connection manager matching the connection management matching feature of the data card, from the plurality of connection managers having the connection management matching features, as a first target connection manager; and starting and only starting the first target connection manager.

Alternatively, the data card connection management method further includes:

when there is no the first target connection manager, judging whether there is a second connection manager which has a same name as a name of a connection manager of the access data card and is compatible with the access data card to obtain a first judgment result;

when the first judgment result indicates that there is the second connection manager, using the second connection manger as a second target connection manager; and starting and only starting the second target connection manger.

Alternatively, the data card connection management method further includes:

when the judgment result indicates that there is no the second target connection manager, installing the connection manager of the access data card; and setting the connection management matching feature of the access data card to be a connection management matching feature of the connection manager.

Alternatively, the data card connection management method further includes:

before installing the connection manager of the access data card, unloading a third connection manager, herein, the third connection manager is a connection manager which is installed on the electronic device and is not able to coexist with the connection manager of the access data card; or the third connection manager is a connection manager which is installed on the electronic device and has a version lower than a version of the connection manager of the access data card.

Alternatively, the plurality of connection managers having the connection management matching features share one overall daemon process.

Alternatively, after the overall daemon process is started, the following steps are executed:

judging whether an existing connection manager on the electronic device records a connection manager matching feature to obtain a second judgment result;

when the second judgment result indicates that the existing connection manager on the electronic device does not record the connection manager matching feature, further judging whether a daemon process of the existing connection manager is consistent with the overall daemon process to obtain a third judgment result; and when the third judgment result indicates that the daemon process of the existing connection manager is not consistent with the overall daemon process, judging that the daemon process of the existing connection manager is not able to coexist with the overall daemon process.

Alternatively, the connection management matching feature of the access data card is set in an ID of the access data card; and the connection management matching feature of the connection manager is set in a data card ID which is recorded by the connection manager.

The present document provides a data card connection management apparatus applied to an electronic device on which a plurality of connection managers having connection management matching features are installed, and the apparatus includes:

a connection matching feature acquisition module configured to, when detecting that an access data card is connected to the electronic device, acquire a connection management matching feature of the access data card;

a first selection module configured to select a connection manager matching the connection management matching feature of the data card, from the plurality of connection managers having the connection management matching features, as a first target connection manager; and a first starting module configured to start and only start the first target connection manager.

Alternatively, the data card connection management apparatus further includes:

a second judgment module configured to, when there is no the first target connection manager, judge whether there is a second connection manager which has a same name as a name of a connection manager of the access data card and is compatible with the access data card exists to obtain a first judgment result;

a second selection module configured to, when the first judgment result indicates that there is the second connection manager, use the second connection manger as a second target connection manager; and a second starting module configured to start and only start the second target connection manger.

Alternatively, the data card connection management apparatus further includes:

a connection manager installation module configured to, when the judgment result indicates that there is no the second target connection manager, install the connection manager of the access data card; and a connection management matching feature recording module configured to set the connection management matching feature of the access data card to be a connection management matching feature of the connection manager.

Alternatively, the data card connection management apparatus further includes:

an unloading module configured to, before installing the connection manager of the access data card, unload a third connection manager, herein, the third connection manager is a connection manager which is installed on the electronic device and is not able to coexist with the connection manager of the access data card; or the third connection manager is a connection manager which is installed on the electronic device and has a version lower than a version of the connection manager of the access data card.

Alternatively, the plurality of connection managers having the connection management matching features share one overall daemon process.

Alternatively, the data card connection management apparatus further includes:

a second judgment module configured to judge whether an existing connection manager on the electronic device records connection manager matching feature to obtain a second judgment result; and a third judgment module configured to, when the second judgment result indicates that the existing connection manager on the electronic device does not record the connection manager matching feature, further judge whether a daemon process of the existing connection manager is consistent with the overall daemon process to obtain a third judgment result; and when the third judgment result indicates that the daemon process of the existing connection manager is not consistent with the overall daemon process, judge that the daemon process of the existing connection manager is not able to coexist with the overall daemon process.

Alternatively, the connection management matching feature of the access data card is set in an ID of the access data card; and the connection management matching feature of the connection manager is set in a data card ID which is recorded by the connection manager.

The present document further provides a data card connection management system, including a data card and the data card connection management apparatus provided by any one of the embodiments, herein the data card has a connection management matching feature of the data card connection management apparatus which is used for matching.

The present document further provides a data card having a connection management matching feature; and the connection management matching feature is used by the data card connection management apparatus provided by any one of the embodiments to match a corresponding connection manager.

As described above, it can be seen that the data card connection management method, apparatus and system and the data card provided by the embodiments of the present document solve the problems that preemption, unable to starting and the like in a process of using various different types of data card connection managers on the electronic device. When the access data card is connected to the electronic device, the connection manager of the access data card is not directly installed and started, but the matching or compatible connection manager is searched from the existing connection managers on the electronic device according to the data card ID and the data card IDs recorded in the existing connection managers, the matching or compatible connection manager is correspondingly used and only used, and thereby the management of different types of connection managers is implemented. The user does not need to install a new connection manager when the data card is replaced with a different type of data card; and the problem that the data card cannot be used since incompatible connection mangers preempt the device does not occur.

In the embodiments of the present document, the times of unloading the existing connection managers are reduced, and the missing of historical data of the user are reduced. In addition, different types of connection managers share the overall daemon process, and the problem caused by conflicts and device preemption between different types of connection managers is solved.

PREFERRED EMBODIMENTS

In order to give effective implementation solutions, the present document provides the following embodiments. The embodiments of the present document will be described below with reference to the drawings.

A data card connection management method is applied to an electronic device on which a plurality of connection managers having connection management matching features are installed, and the data card connection management method includes the following steps:

when it is to detect that an access data card is connected to the electronic device, a connection management matching feature of the access data card is acquired;

a connection manager matching the connection management matching feature of the data card is selected from the plurality of connection managers having the connection management matching features as a first target connection manager; and the first target connection manager is started and only the first target connection manager is started.

Figure 1:
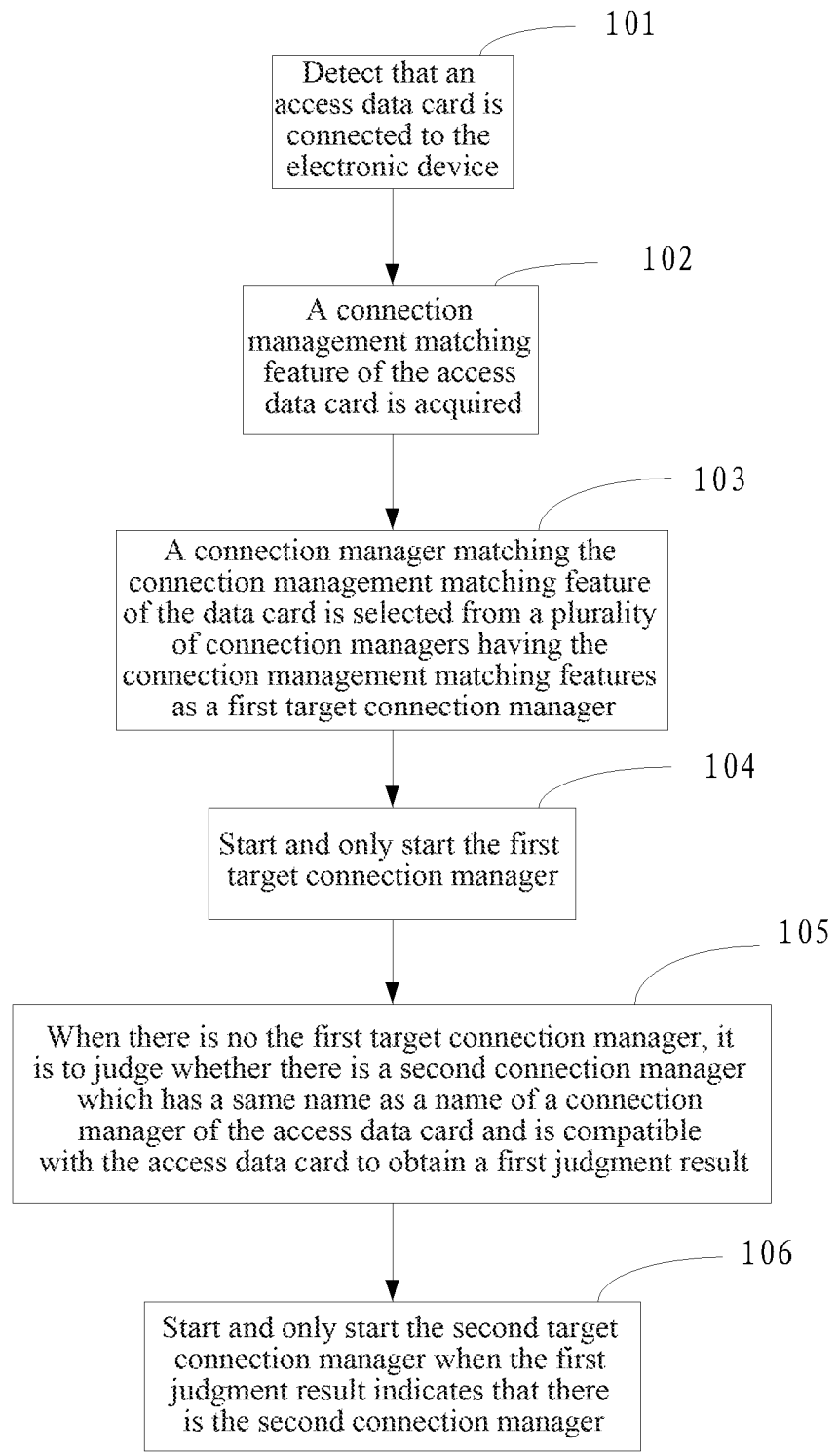
FIG. 1 illustrates a flowchart of a data card connection management method according to one embodiment of the present document.

Referring to FIG. 1, the embodiment of the present document will be further described. The data card connection management method includes:

In step 101, it is to detect that an access data card is connected to the electronic device.

When the access data card is connected to the electronic device through a corresponding interface, it is to detect that the access data card is connected to the electronic device by monitoring changes of data card devices such as compact disk mapping of the data card and network port mapping of the data card.

In step 102, a connection management matching feature of the access data card is acquired.

The connection management matching feature may be set in an ID of the access data card, and may also be set in independence of the ID of the data card.

As one embodiment, the ID of the access data card includes information such as data card type, connection manager version number and category and so on; and the category of the access data card may be judged through the category information.

By taking that the connection management matching feature of the access data card is set in the ID of the access data card as an example, the connection management matching feature may be acquired in step 102 by acquiring the ID of the data card.

In step 103, a connection manager matching the connection management matching feature of the data card is selected from the plurality of connection managers having the connection management matching features as a first target connection manager.

If the connection management matching feature of the access data card is set in the ID of the access data card, the connection management matching feature of the connection manager is set in the data card ID recorded by the connection manager. In step 103, whether the ID is a matching ID is judged by comparing the ID of the access data card with the data card IDs recorded by existing connection managers on the electronic device; and if the ID is the matching ID, the existing connection manager is selected as a first target connection manager.

In step 104, the first target connection manager is started, and only the first target connection manager is started.

When step 104 is executed, the first target connection manager in the existing connection managers on the electronic device is started, and only the first target connection manager is started, such that other connection managers are in a non-started state, different connection managers do not produce mutual conflicts, and the phenomenon that the data card cannot be normally used since the incorrect connection manager is started does not occur.

In the above embodiment, when the access data card is connected to the electronic device, the connection manager of the access data card is not directly installed and started, but the matching first target connection manager is searched from the existing connection managers on the mobile terminal device according to the connection management matching feature of the access data card and the connection management matching features of the existing connection managers, and the first target connection manager is correspondingly used. Since different access data cards may correspond to corresponding categories of connection managers through the connection management matching features, the situation that the data card cannot be used since the non-corresponding connection manager is automatically started is avoided, the conflicts caused by simultaneous starting of a plurality of different connection managers are avoided and the management of the plurality of connection mangers is implemented. Further, the times of unloading and installing the connection manager when the user uses different types of data cards may be effectively reduced, and the user experience is improved.

In some embodiments of the present document, if a judgment result is negative in the step of searching and judging whether there is a second connection manager corresponding to the access data card on the mobile terminal device, the following step is executed:

whether the access data card is of a preset category is judged according to the ID of the access data card, and if yes, the installation instruction is executed.

In step 104, if necessary, a corresponding starting or switching instruction is sent to the access data card through a device port, and then the first target connection manager is started and only the first target connection manager is started when the device port is prepared.

Still referring to FIG. 1, in some embodiments, the data card connection management method further includes the following steps:

In step 105, when there is no the first target connection manager, it is to judge whether there is a second connection manager which has a same name as a name of the connection manager of the access data card and is compatible with the access data card to obtain a first judgment result.

Specifically, step 105 may include the following two steps:

In step 1051, an ID of the access data card is parsed to acquire a name and a serial number of the connection manager of the access data card.

In step 1052, it is to judge whether there is a connection manager which has a same name as a name of the connection manager of the access data card on the electronic device; if yes, the processing proceeds to step 1053; and if no, a first judgment result is obtained, herein the first judgment result indicates that there is no second connection manager which has the same name and is compatible with the access data card.

In step 1053, it is to judge whether the connection manager which has the same name as the name of the connection manager of the access data card is a second connection manager of a higher version; if yes, a first judgment result is obtained, herein the first judgment result indicates that there is the second connection manager; and if no, a judgment result which indicates that there is no the second connection manager is obtained.

In step 106, when the first judgment result indicates that there is the second connection manager, the second target connection manger is started and only the second target connection manger is started.

When step 106 is executed, in the connection managers which have already been installed on the electronic device, the second target connection manager is started and only the second target connection manager is started.

The first target connection manager and the second target connection manager are connection managers corresponding to different types of access data cards. For example, the first target connection manager and the second target connection manager may be respectively a connection manager of a 3G data card and a connection manager of a wifi data card.

In some embodiments, the data card connection management method further includes:

when the judgment result indicates that there is no the second target connection manager, a connection manager of the access data card is installed; and a connection management matching feature of the access data card is set to be a connection management matching feature of the connection manager.

In one situation, the access data card connection management method further includes:

when there is no existing connection manager on the electronic device, a connection manager of the access data card is installed; and a connection management matching feature of the access data card is set to be a connection management matching feature of the connection manager.

In some embodiments, the connection management method further includes:

before the connection manager of the access data card is installed, a third connection manager is unloaded, herein, the third connection manager is a connection manager which is installed on the electronic device and is not able to coexist with the connection manager of the access data card; or the third connection manager is a connection manager which is installed on the electronic device and has a version lower than a version of the connection manager of the access data card.

Figure 2:
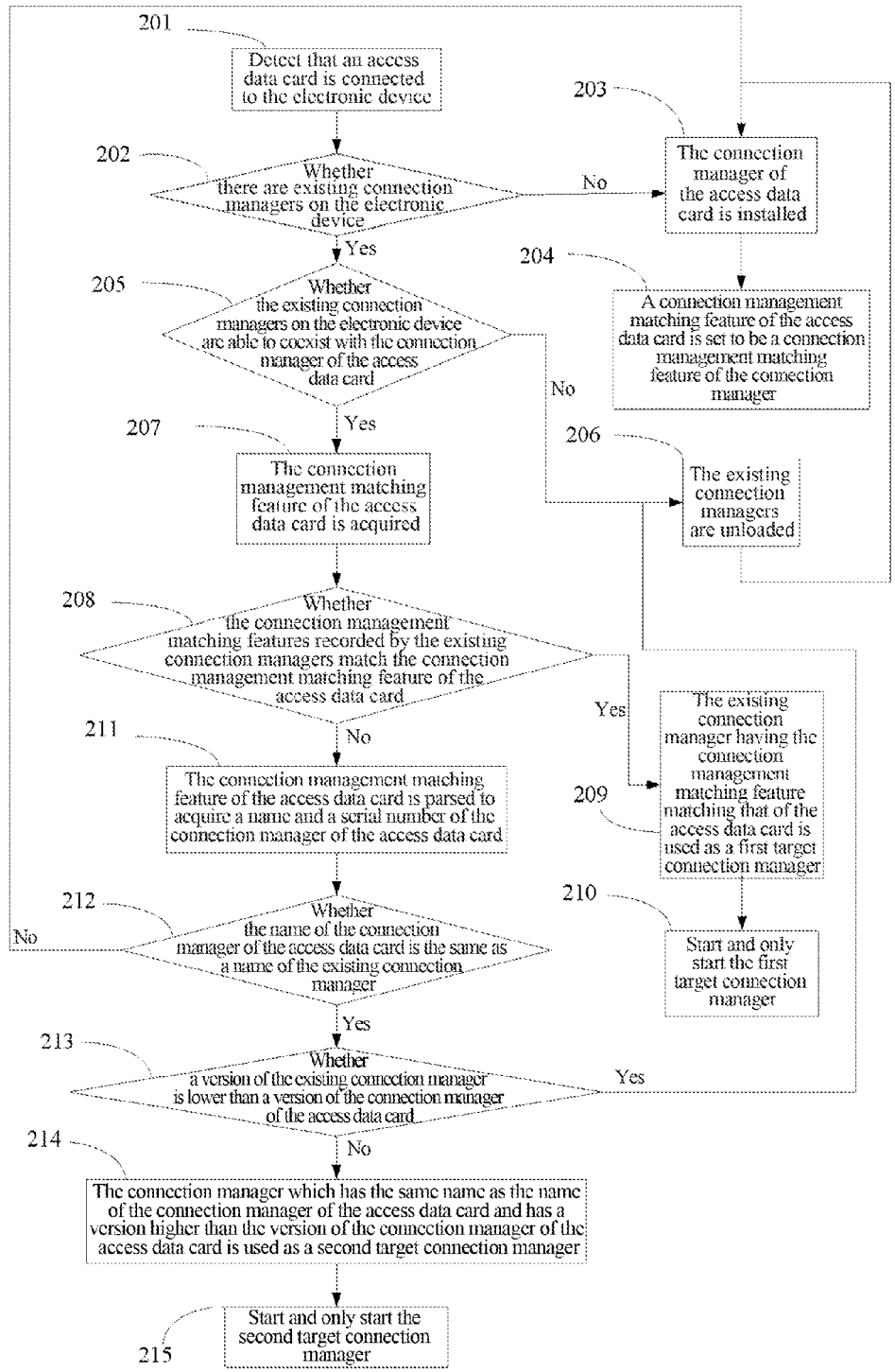
FIG. 2 illustrates a flowchart of a data card connection management method according to another embodiment of the present document.

As one specific embodiment, referring to FIG. 2, the data card connection management method includes:

In step 201, it is to detect that an access data card is connected to the electronic device.

In step 202, whether there are existing connection managers on the electronic device is judged; if yes, the processing proceeds to step 203; and if no, the processing proceeds to step 205.

In one embodiment, when the access data card is connected to the electronic device, the connection manager of the access data card automatically starts an installation process. All programs under an installation directory are quickly scanned when the installation process is started. Whether there are preinstalled existing connection managers under the same installation directory on the electronic device may be known by judging these programs.

In step 203, the connection manager of the access data card is installed, and the processing proceeds to step 204.

In step 204, a connection management matching feature of the access data card is set to be a connection management matching feature of the connection manager.

In step 205, it is to judge whether the existing connection managers on the electronic device are able to coexist with the connection manager of the access data card; if no, the processing proceeds to step 206; and if yes, the processing proceeds to step 207.

In step 206, the existing connection managers are unloaded, and the processing proceeds to step 203.

In step 207, the connection management matching feature of the access data card is acquired.

In step 208, it is to judge whether the connection management matching features recorded by the existing connection managers match the connection management matching feature of the access data card; if yes, the processing proceeds to step 209; and if no, the processing proceeds to step 211.

In step 209, the existing connection manager having the connection management matching feature matching the access data card is used as a first target connection manager.

In step 210, the first target connection manager is started and only the first target connection manager is started.

In step 211, the connection management matching feature of the access data card is parsed to acquire a name and a serial number of the connection manager of the access data card.

In step 212, whether the name of the connection manager of the access data card is the same as a name of an existing connection manager is judged; if yes, the processing proceeds to step 213; and if no, the processing proceeds to step 203.

In step 213, whether a version of the existing connection manager is lower than a version of the connection manager of the access data card is judged according to the serial number; if yes, the processing proceeds to step 206; and if no, the processing proceeds to step 214.

In step 214, the connection manager which has the same name as the name of the connection manager of the access data card and has a version higher than the version of the connection manager of the access data card is used as a second target connection manager.

In step 215, the second target connection manager is started and only the second target connection manager is started.

In the existing connection managers, the second target connection manager is started and only the second target connection manager is started.

The third connection managers include the existing connection managers which are judged to be not able to coexist with the connection manager of the access data card in step 205, and the existing connection managers which have the same name as the name of the connection manager of the access data card but have the lower version in step 213.

In some embodiments, after the access data card is connected to the electronic device, the following step is further executed:

whether the access data card is of a preset category is judged; and if no, a prompt message is sent to the user. Wherein the prompt message is used for prompting the user to replace or upgrade the access data card.

Specifically, whether the access data card is of the preset category may be judged by judging whether the access data card has the connection manager matching feature.

For another example, if the connection management matching feature is recorded in the ID of the access data card, whether the access data card is of the preset category may be judged by judging whether the ID of the access data card is of a preset format.

In the existing art, if the user simultaneously has a 3G data card and a mobile Wifi data card, and the installation paths and software names of the two types of connection mangers are not same, the two types of connection managers may be simultaneously installed on a PC. Even so, since the two connection managers have a respective configuration and background daemon process, consequently both the two connection managers are possibly started when the data card is inserted again, the device is preempted and consequently the connection manager cannot normally operate when network connection and other operations are performed.

In some alternative embodiments of the present document, the plurality of connection managers having the connection management matching features share one overall daemon process.

Since the overall daemon process may be shared by at least two existing connection managers arranged on the electronic device, no matter which type of connection manager is used by the user, the number of the background daemon process is only one, such that the problem of mutual conflicts between different connection managers since daemon processes of different types of connection managers simultaneously operate is avoided. The situation that the device is preempted by the daemon processes of a plurality of connection mangers is also avoided, and the situation that operations such as data card network connection and so on cannot be performed is not caused thereby.

In some situations, the situation that the originally recorded data card ID misses may occur in the existing connection mangers on the electronic device, thereby the daemon process further monitors the connection managers installed on the electronic device.

In some preferred embodiments, after the overall daemon process is started, the existing connection managers on the electronic device are monitored through the following steps:

whether the existing connection managers on the electronic device record connection manager matching features is judged to obtain a second judgment result.

When the second judgment result indicates that the existing connection managers on the electronic device do not record the connection manager matching features, whether a daemon process of the existing connection managers is consistent with the overall daemon process is further judged to obtain a third judgment result.

When the third judgment result indicates that the daemon process of the existing connection managers is not consistent with the overall daemon process, it is to judge that the daemon process of the existing connection managers is not able to coexist with the overall daemon process.

Figure 3:
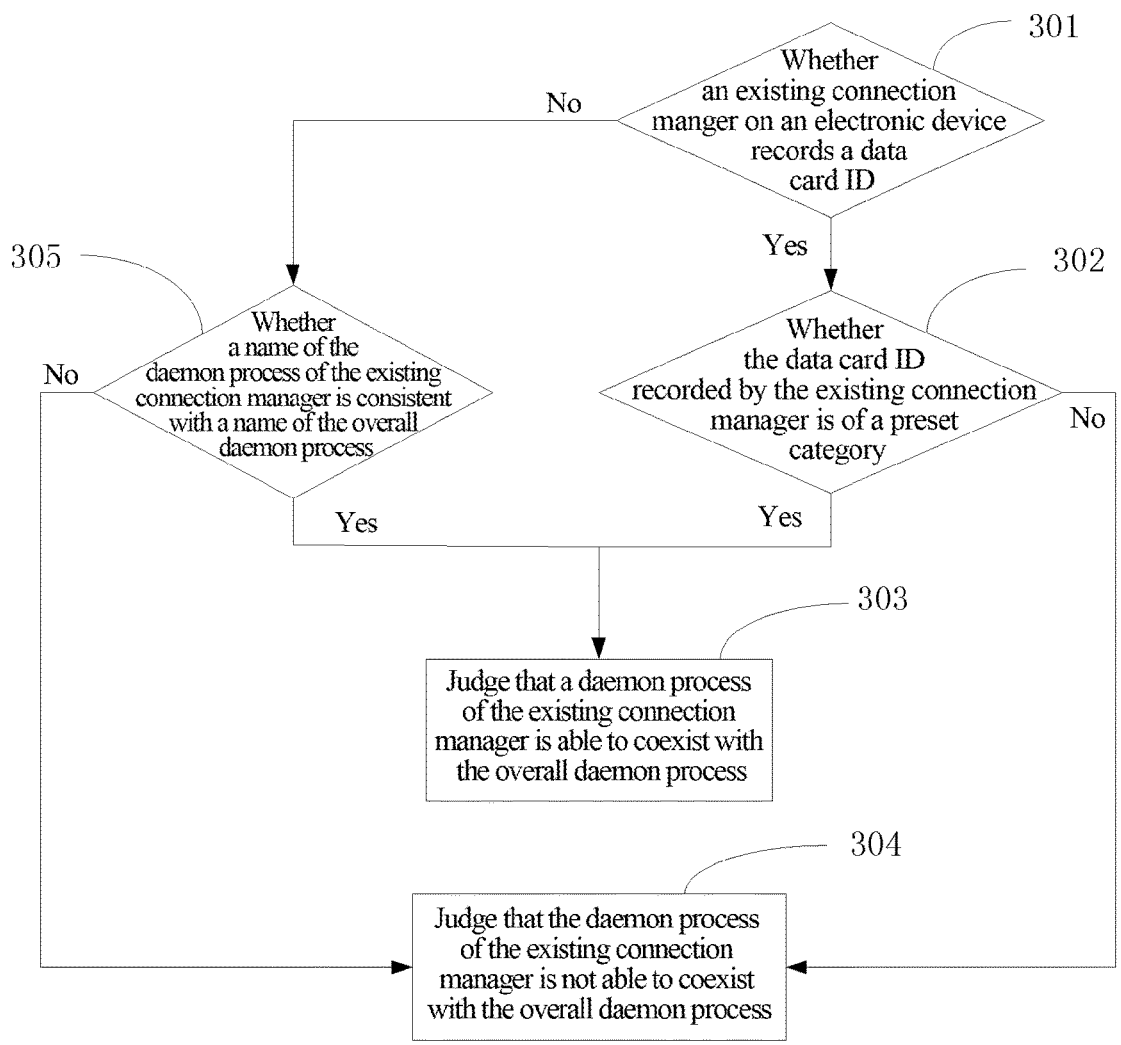
FIG. 3 illustrates a flowchart of monitoring a connection manager through an overall daemon process according to the embodiment of the present document.

Specifically, if the connection management matching feature is set in the data card ID recorded by the connection mangers, referring to FIG. 3, a process of monitoring the existing connection managers after the overall daemon process is started includes the following steps:

In step 301, whether an existing connection manger on an electronic device records a data card ID is judged; if yes, the processing proceeds to a next step; and if no, the processing proceeds to step 305.

In step 302, whether the data card ID recorded by the existing connection manager is of a preset category is judged; if yes, the processing proceeds to step 303; and if no, the processing proceeds to step 304.

Specifically, whether the data card ID recorded by the existing connection manager records a connection management matching feature is judged by parsing the data card ID recorded by the existing connection manager.

In step 303, it is to judge that a daemon process of the existing connection manager is able to coexist with the overall daemon process.

In step 304, it is to judge that the daemon process of the existing connection manager is not able to coexist with the overall daemon process.

In step 305, whether a name of the daemon process of the existing connection manager is consistent with a name of the overall daemon process is judged to obtain a third judgment result. When the third judgment result indicates that the name of the daemon process of the existing connection manager is consistent with the name of the overall daemon process, the processing proceeds to step 303; and when the third judgment result indicates that the name of the daemon process of the existing connection manager is not consistent with the name of the overall daemon process, the processing proceeds to step 304.

If it is to judge that the daemon process of the existing connection manager on the electronic device is not able to coexist with the overall daemon process, that is, it is to judge there is a connection manager which is not supported by the overall daemon process on the electronic device, a message of unable to coexistence may be output. The user may unload or upgrade the existing connection manager on the electronic device according to the message.

As one alternative embodiment, the connection management matching feature of the access data card is set in an ID of the access data card; and the connection management matching feature of the connection manager is set in a data card ID which is recorded by the connection manager.

Figure 4:
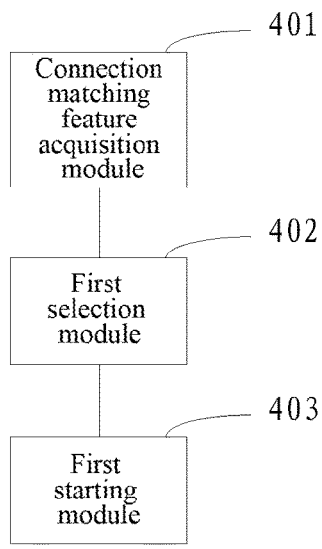
FIG. 4 is a structural schematic diagram of a data card connection management apparatus according to one embodiment of the present document.

Further, the present document provides a data card connection management apparatus applied to an electronic device on which a plurality of connection managers having connection management matching features are installed, and the structure of the apparatus is illustrated in FIG. 4, and includes:

a connection matching feature acquisition module 401 used to, when detecting that an access data card is connected to the electronic device, acquire a connection management matching feature of the access data card;

a first selection module 402 used to select a connection manager matching the connection management matching feature of the data card from the plurality of connection managers having the connection management matching features as a first target connection manager; and a first starting module 403 used to start and only start the first target connection manager.

As described above, it can be seen that, in the data card connection management apparatus provided by the embodiment of the present document, when the access data card is connected to the electronic device, the connection manager corresponding to the access data card is searched and used according to the connection management matching features set in the access data card and the existing connection managers, other connection managers are not used. The phenomenon that the data card cannot be used since the current started connection manager is not adaptable to the access data card does not occur. The problem that the device is preempted and the connection managers installed on the electronic device are simultaneously started when the data card is connected is avoided. The problem that network connection and other operations cannot be performed by the connection manager due to the preemption of the device is avoided.

In some embodiments, the apparatus further includes:

a second judgment module used to, when there is no the first target connection manager, judge whether there is a second connection manager which has a same name as a name of the connection manager of the access data card and is compatible with the access data card to obtain a first judgment result;

a second selection module used to, when the first judgment result indicates that there is the second connection manager, use the second connection manger as a second target connection manager; and a second starting module used to start and only start the second target connection manger.

In some embodiments, the data card connection management apparatus further includes:

a connection manager installation module used to, when the judgment result indicates that there is no the second target connection manager, install a connection manager of the access data card; and a connection management matching feature recording module used to set a connection management matching feature of the access data card to be a connection management matching feature of the connection manager.

In some embodiments, the data card connection management apparatus further includes:

an unloading module used to, before installing the connection manager of the access data card, unload a third connection manager, herein, the third connection manager is a connection manager which is installed on the electronic device and is not able to coexist with the connection manager of the access data card; or the third connection manager is a connection manager which is installed on the electronic device and has a version lower than a version of the connection manager of the access data card.

In some embodiments, the plurality of connection managers having the connection management matching features share one overall daemon process.

In general situations, since connection managers having different names are able to coexist. However, in the embodiment of the present document, different types of connection managers adopt one overall daemon module to execute a daemon process, and thereby the problem that two connection managers installed on the electronic device are simultaneously started and preempt the device is more fully avoided.

In some embodiment, the data card connection management apparatus further includes:

a second judgment module used to judge whether the existing connection managers on the electronic device record connection manager matching features to obtain a second judgment result; and a third judgment module used to, when the second judgment result indicates that the existing connection managers on the electronic device do not record the connection manager matching features, further judge whether a daemon process of the existing connection managers is consistent with the overall daemon process to obtain a third judgment result; and when the third judgment result indicates that the daemon process of the existing connection managers is not consistent with the overall daemon process, judge that the daemon process of the existing connection managers is not able to coexist with the overall daemon process.

In some embodiments, the connection management matching feature of the access data card is set in an ID of the access data card; and the connection management matching feature of the connection manager is set in a data card ID which is recorded by the connection manager.

Figure 5:
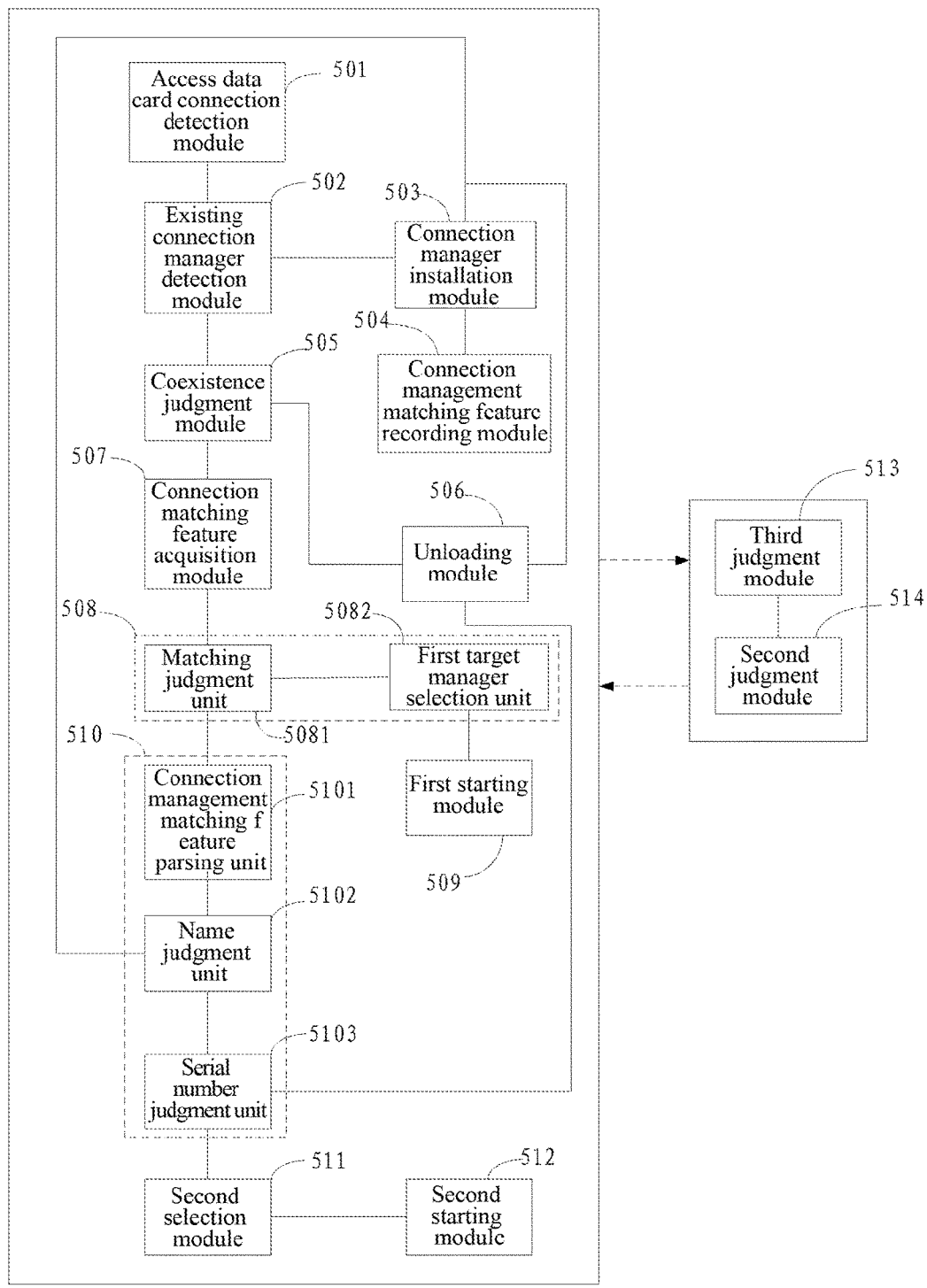
FIG. 5 is a structural schematic diagram of a data card connection management apparatus according to another embodiment of the present document.

In some specific embodiments, as illustrated in FIG. 5, a data card connection management apparatus includes:

an access data card connection detection module 501 used to detect that an access data card is connected to the electronic device;

an existing connection manager detection module 502 used to judge whether there is an existing connection manager on the electronic device; if no, trigger a connection manager installation module; and if yes, trigger a coexistence judgment module;

the connection manager installation module 503 used to install a connection manager of the access data card;

a connection management matching feature recording module 504 used to save a connection management matching feature of the access data card to be a connection management matching feature of the installed connection manager;

the coexistence judgment module 505 used to judge whether the existing connection manager on the electronic device is able to coexist with the connection manager of the access data card; if no, trigger an unloading module; and if yes, trigger a connection management matching feature acquisition module;

the unloading module 506 used to unload the existing connection manager and trigger the connection manager installation module after unloading;

the connection matching feature acquisition module 507 used to acquire the connection management matching feature of the access data card;

a first selection module 508 used to select a connection manager having a connection management matching feature matching the connection management matching feature of the data card from the plurality of connection managers as a first target connection manager.

the first selection module further includes:

a matching judgment unit 5081 used to judge whether the connection management matching feature recorded by the existing connection manager matches the connection management matching feature of the access data card; if yes, trigger a first target manager selection unit; and if no, trigger a second judgment module; and the first target manager selection unit 5082 used to use the existing connection manager having the connection management matching feature matching the connection management matching feature of the access data card as a first target connection manager;

a first starting module 509 used to start and only start the first target connection manager;

the second judgment module 510 used to, when there is no the first target connection manager, judge whether there is a second connection manager which has a same name as a name of the connection manager of the access data card and is compatible with the access data card to obtain a first judgment result.

the second judgment module further includes:

a connection management matching feature parsing unit 5101 used to parse the connection management matching feature of the access data card to acquire a name and a serial number of the connection manager of the access data card;

a name judgment unit 5102 used to judge whether the name of the connection manager of the access data card is the same as the name of the existing connection manager; if yes, trigger a serial number judgment unit; and if no, trigger the connection manager installation module; and the serial number judgment unit 5103 used to judge whether a version of the existing connection manager is lower than a version of the connection manager of the access data card according to the serial number; if yes, trigger the unloading module; and if no, trigger a second selection module;

the second selection module 511 used to, when the first judgment result indicates that there is the second connection manager, use the second connection manger as a second target connection manager. In other words, the second selection module is used to select the connection manager which has a same name as the name of the connection manager of the access data card and has a version higher than the version of the connection manager of the access data card as a second target connection manager;

a second starting module 512 used to start and only start the second target connection manager;

a second judgment module 514 used to judge whether the existing connection manager on the electronic device records a connection manager matching feature to obtain a second judgment result; and a third judgment module 513 used to, when the second judgment result indicates that the existing connection manager on the electronic device does not record the connection manager matching feature, further judge whether a daemon process of the existing connection manager is consistent with the overall daemon process to obtain a third judgment result; and when the third judgment result indicates that the daemon process of the existing connection manager is not consistent with the overall daemon process, judge that the daemon process of the existing connection manager is not able to coexist with the overall daemon process.

The present document further provides a data card connection management system, herein, the data card connection management system includes a data card and the data card connection management apparatus provided by any one of the embodiments of the present document, herein the data card has a connection management matching feature of the data card connection management apparatus which is used for matching.

The present document further provides a data card, having a connection management matching feature; and the connection management matching feature is used by the data card connection management apparatus provided by any one of the embodiments of the present document to match a corresponding connection manager.

It shall be understood that the plurality of embodiments described in the description are only used for describing and explaining the present document instead of limiting the present document, and the embodiments in the present application and the features in the embodiments may be mutually combined under the situation of no conflict.

Obviously, one skilled in the art may make various modifications and variations to the present document without departing from the rule and scope of the present document. Therefore, as long as these modifications and variations made to the present document are covered by the scope of the claims of the present document and the equivalent techniques thereof, the present document is also intended to cover these modifications and variations.

INDUSTRIAL APPLICABILITY

In the embodiments of the present document, the times of unloading the existing connection managers are reduced, and the missing of historical data of the user are reduced. In addition, different types of connection managers share the overall daemon process, and the problem caused by conflicts and apparatus preemption between different types of connection managers is solved.

What I claim is:

1. A data card connection management method, wherein, the data card connection management method is applied to an electronic device on which a plurality of connection managers having connection management matching features are installed, and the data card connection management method comprises the following steps:

when detecting that an access data card is connected to the electronic device, acquiring a connection management matching feature of the access data card;

selecting a connection manager matching the connection management matching feature of the data card, from the plurality of connection managers having the connection management matching features, as a first target connection manager; and starting and only starting the first target connection manager, the method further comprising:

when there is no the first target connection manager, judging whether there is a second connection manager which has a same name as a name of a connection manager of the access data card and is compatible with the access data card to obtain a first judgment result;

when the first judgment result indicates that there is the second connection manager, using the second connection manger as a second target connection manager; and starting and only starting the second target connection manager.

2. The method according to claim 1, further comprising:

when the judgment result indicates that there is no the second target connection manager, installing the connection manager of the access data card; and setting the connection management matching feature of the access data card to be a connection management matching feature of the connection manager.

3. The method according to claim 2, further comprising:

before installing the connection manager of the access data card, unloading a third connection manager, wherein, the third connection manager is a connection manager which is installed on the electronic device and is not able to coexist with the connection manager of the access data card; or the third connection manager is a connection manager which is installed on the electronic device and has a version lower than a version of the connection manager of the access data card.

4. The method according to claim 1, wherein the plurality of connection managers having the connection management matching features share one overall daemon process.

5. The method according to claim 4, wherein, after the overall daemon process is started, the following steps are executed:

judging whether an existing connection manager on the electronic device records a connection manager matching feature to obtain a second judgment result;

when the second judgment result indicates that the existing connection manager on the electronic device does not record the connection manager matching feature, further judging whether a daemon process of the existing connection manager is consistent with the overall daemon process to obtain a third judgment result; and when the third judgment result indicates that the daemon process of the existing connection manager is not consistent with the overall daemon process, judging that the daemon process of the existing connection manager is not able to coexist with the overall daemon process.

6. The method according to claim 1, wherein the connection management matching feature of the access data card is set in an ID of the access data card; and the connection management matching feature of the connection manager is set in a data card ID which is recorded by the connection manager.

7. A data card connection management apparatus, wherein, the data card connection management apparatus is applied to an electronic device on which a plurality of connection managers having connection management matching features are installed, and the apparatus comprises:

a connection matching feature acquisition module configured to, when detecting that an access data card is connected to the electronic device, acquire a connection management matching feature of the access data card;

a first selection module configured to select a connection manager matching the connection management matching feature of the data card, from the plurality of connection managers having the connection management matching features, as a first target connection manager; and a first starting module configured to start and only start the first target connection manager, the apparatus further comprising:

a second judgment module configured to, when there is no the first target connection manager, judge whether there is a second connection manager which has a same name as a name of a connection manager of the access data card and is compatible with the access data card to obtain a first judgment result;

a second selection module configured to, when the first judgment result indicates that there is the second connection manager, use the second connection manger as a second target connection manager; and a second starting module configured to start and only start the second target connection manager.

8. The apparatus according to claim 7, further comprising:

a connection manager installation module configured to, when the judgment result indicates that there is no the second target connection manager install the connection manager of the access data card; and a connection management matching feature recording module configured to set the connection management matching feature of the access data card to be a connection management matching feature of the connection manager.

9. The apparatus according to claim 8, further comprising:

an unloading module configured to, before installing the connection manager of the access data card, unload a third connection manager, wherein, the third connection manager is a connection manager which is installed on the electronic device and is not able to coexist with the connection manager of the access data card; or the third connection manager is a connection manager which is installed on the electronic device and has a version lower than a version of the connection manager of the access data card.

10. The apparatus according to claim 7, wherein the plurality of connection managers having the connection management matching features share one overall daemon process.

11. The apparatus according to claim 10, further comprising:

a second judgment module configured to judge whether an existing connection manager on the electronic device records a connection manager matching feature to obtain a second judgment result; and a third judgment module configured to, when the second judgment result indicates that the existing connection manager on the electronic device does not record the connection manager matching feature, further judge whether a daemon process of the existing connection manager is consistent with the overall daemon process to obtain a third judgment result; and when the third judgment result indicates that the daemon process of the existing connection manager is not consistent with the overall daemon process, judge that the daemon process of the existing connection manager is not able to coexist with the overall daemon process.

12. The apparatus according to claim 7, wherein the connection management matching feature of the access data card is set in an ID of the access data card; and the connection management matching feature of the connection manager is set in a data card ID which is recorded by the connection manager.

13. A data card connection management system, comprising a data card and the data card connection management apparatus according to claim 7, wherein the data card has a connection management matching feature of the data card connection management apparatus which is used for matching.

14. A data card, wherein, the data card has a connection management matching feature; and the connection management matching feature is used by the data card connection management apparatus according to claim 7 to match a corresponding connection manager.

* * * * *